United States Patent [19]

Hockaday

[11] Patent Number: 4,673,624

[45] Date of Patent: Jun. 16, 1987

[54] FUEL CELL

[76] Inventor: Robert G. Hockaday, 954 Capulin Rd., Los Alamos, N. Mex. 87544

[21] Appl. No.: 577,956

[22] Filed: Feb. 8, 1984

[51] Int. Cl.⁴ .......................................... H01M 4/86
[52] U.S. Cl. ...................................... 429/41; 429/49; 429/45
[58] Field of Search ...................... 429/41, 40, 42, 44, 429/45; 427/115

[56] References Cited

U.S. PATENT DOCUMENTS

| | | | |
|---|---|---|---|
| 3,196,048 | 7/1965 | Shropshire et al. | 429/41 |
| 3,297,484 | 1/1967 | Niedrach | 429/41 |
| 3,348,974 | 10/1967 | Barber et al. | 429/41 |
| 3,351,487 | 11/1967 | Levine et al. | 427/115 |
| 3,467,552 | 9/1969 | Giner | 429/41 |
| 3,787,244 | 1/1974 | Schulmeister et al. | 427/115 |
| 3,979,227 | 9/1976 | Katz et al. | 429/42 |
| 4,100,331 | 7/1978 | Fletcher et al. | 429/41 X |
| 4,297,421 | 10/1981 | Turillon | 429/225 |
| 4,328,086 | 5/1982 | Takenaka et al. | 429/41 X |
| 4,345,008 | 8/1982 | Breault | 429/41 X |

Primary Examiner—Brian E. Hearn
Assistant Examiner—Stephen Kalafut
Attorney, Agent, or Firm—James C. Wray

[57] ABSTRACT

A fuel cell is constructed of three porous membranes filled with electrolyte. Outer membranes are plated externally with a metal film. The metal films are coated with a release agent. A catalyst film is coated on the release agent and on annular edges of the metal films adjacent each pore of the membranes. Dissolving the release agent recovers the catalyst and leaves only a small catalyst ring on the exposed edges of the metal electrodes adjacent the pores. Metal grids may be added to aid in conduction of electricity. Electrolyte within the porous membrane sandwich is exposed to fuel gas adjacent one electrode and to oxidizer gas adjacent the other electrode in the areas of the catalyst rings, resulting in a compact fuel cell and a highly efficient use of catalyst.

11 Claims, 9 Drawing Figures

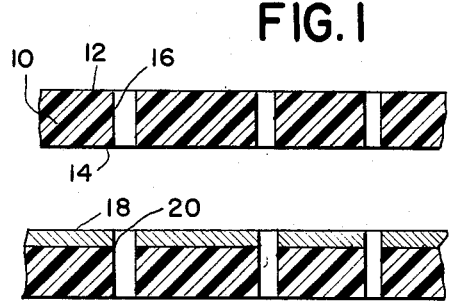
FIG. 1
FIG. 2
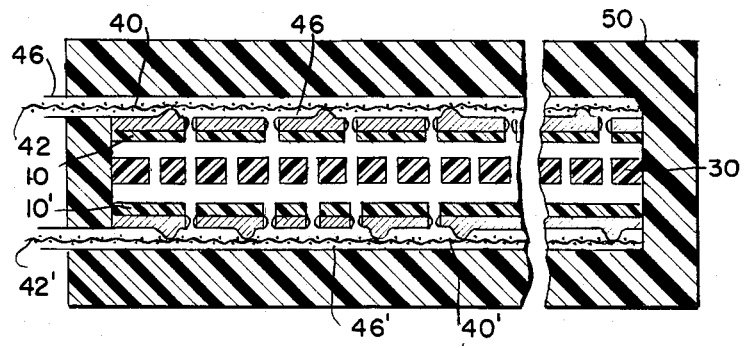
FIG. 8
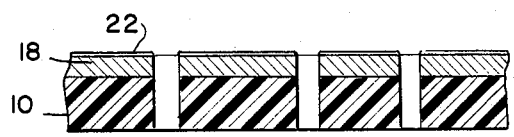
FIG. 3
FIG. 4
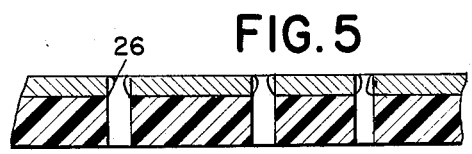
FIG. 5
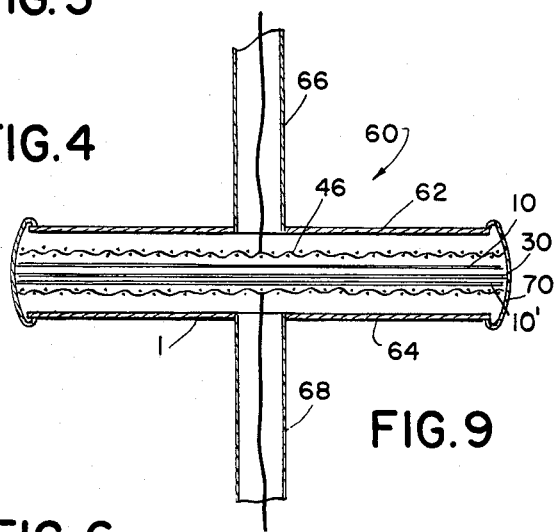
FIG. 9
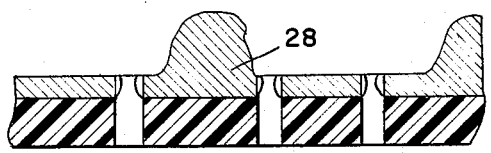
FIG. 6
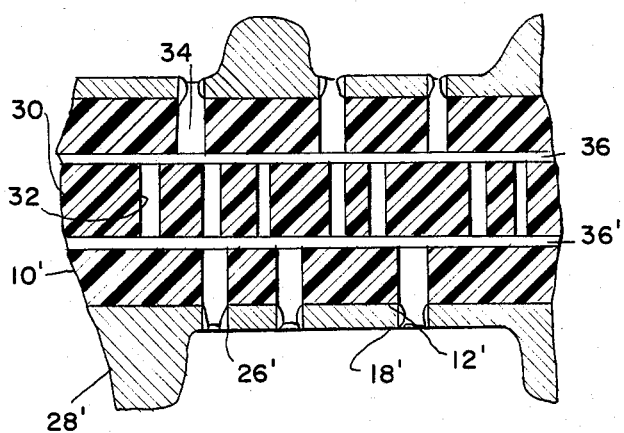
FIG. 7

FUEL CELL

BACKGROUND OF THE INVENTION

Fuel cells transform chemical energy to electrical energy by reacting gas in the presence of an electrolyte, electrodes and a catalyst. A catalyst may be platinum or an expensive material. Consequently, it is desirable to use as little catalyst as possible.

Fuel cells are often used to generate electricity in remote locations, such as in space, and, consequently, it is highly desirable to construct a fuel cell as compact and as lightweight as possible.

A number of fuel cells are described in United States patents officially referenced and cross referenced and foreign patents and publications unofficially collected by examiners in Class 429 of the U.S. Patent and Trademark Office.

U.S. Pat. No. 3,598,657 is an example of a thin, platinum coating on a fuel cell electrode.

U.S. Pat. No. 4,125,676 is a recent example of porous fuel cells with thin catalyst layers.

U.S. Pat. Nos. 3,318,730, 3,617,385, 3,770,508, 4,031,219 and 4,128,701 are of general interest as representative of patents found in Class 429.

U.S. Pat. No. 3,787,244 describes forcing a salt of a metal catalyst through pores of a substrate to cause plating of the catalyst within the pores.

U.S. Pat. No. 3,226,719 describes the coating of a porous substrate with a metal film having the same porosity as a substrate.

U.S. Pat. No. 3,776,776 is an example of a process in which metals are coated on fuel cell electrodes.

U.S. Pat. No. 3,351,487 is an example of plating inner surfaces of fibers in a permeable membrane.

A need persists for fuel cells having extremely compact and light constructions with economical use of materials and, particularly, economical uses of catalyst.

SUMMARY OF THE INVENTION

The present invention provides compact fuel cells having economic use of materials.

A fuel cell is constructed of three porous membranes filled with electrolyte. Outer membranes are plated externally with a metal film. The metal films are coated with a release agent. A catalyst film is coated on the release agent and on annular edges of the metal films adjacent each pore of the membranes. Dissolving the release agent recovers the catalyst and leaves only a small catalyst ring on the exposed edges of the metal electrodes adjacent the pores. Metal grids may be added to aid in conduction of electricity. Electrolyte within the porous membrane sandwich is exposed to fuel gas adjacent one electrode and to oxidizer gas adjacent the other electrode in the areas of the catalyst rings, resulting in a compact fuel cell and a highly efficient use of catalyst.

Principal advantages of the invention are found in the high utilization of the catalyst, in the controlled geometry, which permits control of the catalyst location and of the electrolyte, in low-cost materials which are used in the bulk of construction, and in the design which minimizes the thickness of the cell, as well as the cell weight.

The fuel cell of the present invention is suited for use with gaseous fuels and liquid electrolytes. A major innovation of the design is the use of porous membranes in which pores are created by charged particle bombardment and subsequent etching. The geometry of the membrane and the pores permits accurate location control of the electrolyte, catalysts and gases. The electrode has the possibility of making fuel cells economically competitive with conventional energy sources and energy storage systems. Present fuel cells are uneconomical because of the expensive catalyst and materials used.

Preferably, the substrate for the electrode is a Nuclepore membrane filter or a membrane material in which energetic nuclear particles, for example, alpha particles, have formed pores, which have been enlarged by appropriate chemical etching. Suitable materials for the membranes are dielectrics. Plastics are particularly well suited as membrane substrates. The bombardment particles are usually charged nuclear particles and are most commonly alpha particles from a radioactive source.

Surface of the membrane is made conductive by evaporating, sputtering, electrochemically plating, photochemically or chemically depositing a conductive metal film on the membrane without covering the pores. While it is preferred to use a coated porous dielectric membrane, one may use a membrane which is naturally conductive or which is dopable to be conductive, either before or after the etching process.

A release agent is evaporated or deposited on the outer surfaces of the conductive coating on the membrane where the catalyst is not useful. If the pore density is high enough or recovery of the catalyst is not desired, the release agent step may be eliminated.

A catalyst is sputtered, evaporated or chemically deposited on surfaces of the coating and within the pores. The release agent is dissolved, and excess catalyst is removed and recovered, leaving the catalyst coating exposed edges of the metal plating within the pores.

To increase conductivity a metal grid is sputtered or chemically deposited on the metal coating.

The electrode is ready for fuel cell assembly. First and second membranes with platings are on opposite outer sides. Preferably, the two outer porous membranes are separated by one or more inner porous membranes which retains an electrolyte. Alternatively, opposite sides of a porous membrane may be plated to serve as electrodes.

The assembled fuel cell uses either hyrdophobic or hydrophilic pores with the catalyst plated out or in the pores respectively.

A preferred embodiment of the fuel cell as shown used hydrophilic pores and has one blank membrane spacer.

A preferred fuel cell apparatus includes porous membrane means. Electrolyte is disposed within pores of the porous membrane means. Electrode means are mounted on faces of the porous membrane means. Catalyst means are connected to the porous membrane means for promoting transformation of chemical and electrical energy.

The preferred fuel cell apparatus has as membranes thin plastic films having pores formed therein by penetration of nuclear particles through the films and enlarged by etching.

In preferred embodiments, the membrane means has first and second opposite faces, with pores in the membranes extending through the electrode platings on the opposite faces.

Preferably, the catalyst is plated on the electrode platings within pores in the platings.

The preferred fuel cell apparatus further comprises first and second conductive grids respectively connected to the first and second electrode platings. First and second meshes electrically contact the first and second grids. An enclosure surrounds the meshes and grids. First means are connected to the enclosure for introducing a first gas adjacent the first face of the membrane. Second means are connected to the enclosure for introducing a second gas adjacent the second face of the membrane means.

A preferred fuel cell apparatus includes membrane means having pores therein for holding an electrolyte, a first electrode connected to the membrane means near pores therein and a second electrode connected to the membrane means near pores therein, the first and second electrodes being mutually spaced, and catalyst means respectively connected to the first and second electrodes near pores in the membrane means for contacting electrolyte within the pores and contacting the electrodes.

In the preferred fuel cell apparatus, the pores in the membrane means continue through the electrodes, and the catalyst means is plated as rings within the pores in the electrodes for contacting electrolyte and the electrodes. Preferably, first and second conductive grids electrically contact with the first and second electrodes for conducting current from the electrodes.

Enclosure means surround the membrane, electrodes and grids. First means supplies fuel gas to the electrolyte adjacent the first electrode, and second means supplies oxidizer gas to the electrolyte adjacent the second electrode.

The preferred method of constructing fuel cells comprises forming pores in a membrane, plating a metal film on the membrane with the pores extending through the metal film, adding a catalyst to the metal film adjacent the pores and adding an electrolyte.

The preferred method further comprises adding a second porous membrane with a second porous metal film to the first membrane and adding a catalyst to the second metal film and second membrane adjacent the pores.

Preferably, at least one porous membrance is interposed between the first and second porous membranes, and an electrolyte is disposed within pores of the membranes.

The preferred method of forming a fuel cell further comprises coating the external surfaces of the metal film electrodes with a release agent, depositing a catalyst film coating on the release agent coating and on annular portions of the metal film associated with the pores, removing the release agent coating and the catalyst on the release agent coating and reclaiming the removed catalyst and leaving annular catalyst coatings within annular portions of the metal film adjacent the pores.

The preferred method of forming a fuel cell further comprises adding metal grids to the metal film and contacting the metal grids with conductive meshes.

The preferred method further comprises enclosing the membranes and providing separate fuel and oxidizer gas supplies to the membranes.

These and further objects and features of the invention are apparent in the disclosure, which includes the above and ongoing description, including the claims, and in the drawing.

BRIEF DESCRIPTION OF THE DRAWINGS

FIG. 1 shows a porous membrane used in a new fuel cell of the present invention.

FIG. 2 shows the porous membrane of FIG. 1 plated with a metallic electrode.

FIG. 3 shows the plated membrane of FIG. 2 with a release coating.

FIG. 4 shows the plated and coated membrane of FIG. 3 with a catalyst coating.

FIG. 5 shows the membrane of FIG. 4 in which the catalyst has been removed from an outer surface of the metallic electrode, leaving catalytic rings around the pore openings.

FIG. 6 shows the plated and catalyst-coated membrane of FIG. 5 with a conductive grid added to the metallic electrode.

FIG. 7 shows an assembled fuel cell apparatus with first and second reversed membranes and an interposed plain porous membrane.

FIG. 8 shows fuel cell apparatus within an enclosure with a conductive mesh contacting the conductive grid and with means for introducing fuel gas and oxidizer gas.

FIG. 9 shows an alternate form of porous membrane fuel cell of the present invention.

DETAILED DESCRIPTION OF THE DRAWINGS

Referring to FIG. 1, a fuel cell apparatus is constructed of a porous membrane 10, for example, a thin, polycarbonate membrane approximately 10 $\mu$m thick. Kimfol is a suitable material, although other plastics having similar chemical structure would also be acceptable. The membrane is bombarded with nuclear particles, for example, alpha particles, forming extremely fine pores, which are enlarged, such as by chemical etching, to approximately 8 $\mu$m in diameter. The membrane is bombarded with a sufficiently radioactive material after a sufficient period of time to provide approximately 5% porosity when etched. A suitable membrane may be cut in a circle with approximately a 1" diameter.

The membrane 10 shown in FIG. 1 has an outer surface 12 and an inner surface 14 and pores 16 formed therethrough.

As shown in FIG. 2, a metal coating 18 is added to the outer surface 12. The metal plating has pores 20 in continuation of the pores 16 of the membrane. A suitable metal electrode coating may be formed by sputter coating surface 12 of the membrane with approximately 1,000 angstrom units of tantalum and/or evaporated carbon.

As shown in FIG. 3, a release coating 22 is deposited on the outer surface of the metallic electrode 18. Thereafter, as shown in FIG. 4, a catalyst coating 24 is added, such as by sputtering a coating of platinum approximately 200 angstrom units thick. The platinum coating extends 26 into the pores.

As shown in FIG. 5, the release coating is removed, recovering the platinum coating 24 and leaving the platinum rings 26 in the pores.

As shown in FIG. 6, a conductive grid structure 28 may be added to the metal coating 18 to enhance conductivity and to provide connections with a conductive mesh without disturbing the metallic electrode coating or the membrane. Any conductive material which will connect to the metallic electrode is suitable for use as a grid. The grid may be formed in situ or may be preformed before attaching to the metallic electrode.

As shown in FIG. 6, a second electrode 10′ with a reversed outer surface 12′ and a metallic electrode 18′, catalyst 26′ and grid 28′ is spaced opposite from the first electrode by an intermediate membrane 30. The intermediate membrane 30 has pores 32, similar to the pores of the outer membranes. An electrolyte 34 fills all of the pores, as well as the spaces 36 and 36′ between the membranes.

Any suitable electrolyte may be used. In the present case, a 3N $H_2SO_4$ electrolyte is used.

As shown in FIG. 8, conductive meshes 40 and 40′ contact the respective grids on the electrodes. Conductors 42 and 42′ conduct current from the fuel cell.

Fuel gas and oxidizer gas, for example, hydrogen and oxygen, are introduced into spaces 46 and 46′ adjacent the electrodes. The entire fuel cell is surrounded by an enclosure 50.

As shown in FIG. 9, the fuel cell 1 has membranes 10, 10′ and 30 surrounded by an enclosure 60. The enclosure includes an upper plate 62 and lower plate 64 with tubes 66 and 68 through which gas is introduced and through which the electrical leads are threaded. Outer edges of the plates and outer edges of the membranes are sealed by a circular surrounding collar 70.

While the invention has been described with reference to specific embodiments, modifications and variations may be constructed without departing from the scope of the invention.

The scope of the invention is defined in the following claims.

I claim:

1. Fuel cell apparatus comprising porous membrane means, electrolyte disposed within pores created by charged particle bombardment and enlarged by chemical etching of the porous membrane means, a metal film electrode coating means mounted on faces of the porous membrane means and small catalyst ring means on edges of the metal electrode coating adjacent said pores for promoting transformation of chemical and electrical energy.

2. The fuel cell apparatus of claim 1 wherein the membrane means comprise thin plastic films having pores formed therein by penetration of nuclear particles through the films.

3. The fuel cell apparatus of claim 2 wherein the membrane apparatus pores are enlarged by etching.

4. The fuel cell apparatus of claim 1 wherein the membrane apparatus comprises layers of membranes having nuclear particle formed pores enlarged by etching.

5. The fuel cell apparatus of claim 4 wherein the membrane means has first and second opposite faces and wherein the electrodes are plated on the first and second opposite faces with pores in the membranes extending through the electrode platings on the opposite faces.

6. The fuel cell apparatus of claim 5 further comprising first and second conductive grids respectively connected to the first and second electrode platings.

7. The fuel cell apparatus of claim 6 further comprising first and second contact meshes in electrical contact respectively with the first and second grids.

8. The fuel cell apparatus of claim 1 further comprising an enclosure surrounding the meshes and grids and first means connected to the enclosure for introducing a first gas adjacent the first face of the membrane and second means connected to the enclosure for introducing a second gas adjacent the second face of the membrane means.

9. Fuel cell apparatus comprising a membrane having pores created by charged particle bombardment and enlarged by chemical etching therein for holding an electrolyte, a first metal film electrode coating connected to the membrane means near pores therein, and a second metal film electrode coating connected to the membrane means near pores therein, the first and second electrodes being mutually spaced, and catalyst means respectively connected to the first and second metal film electrode coatings on exposed edges of the metal electrode coatings adjacent pores in the membrane for contacting electrolyte within the pores and contacting the electrodes, wherein said pores in said membrane means extend through the electrodes and wherein the catalyst means is connected to only edges of said pores in said metal electrode coatings.

10. The fuel cell apparatus of claim 9 further comprising first and second conductive grids in electrical contact with the first and second electrodes for conducting current from the electrodes.

11. The fuel cell apparatus of claim 9 further comprising enclosure means surrounding the membrane, electrodes and grids and first means for supplying fuel gas to the electrolyte adjacent the first electrode and second means for supplying oxidizer gas to the electrolyte adjacent the second electrode.

* * * * *